March 22, 1960
P. ZALM
2,929,678
METHOD OF PRODUCING ZINC SELENIDE
Filed April 10, 1957
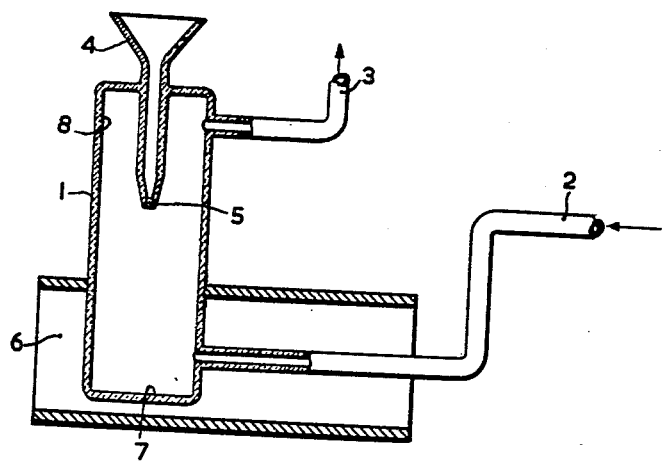
INVENTOR
PIETER ZALM
BY
AGENT United States Patent Office 2,929,678
Patented Mar. 22, 1960

2,929,678

METHOD OF PRODUCING ZINC SELENIDE

Pieter Zalm, Eindhoven, Netherlands, assignor to North American Philips Company Inc., New York, N.Y., a corporation of Delaware Application April 10, 1957, Serial No. 652,026

Claims priority, application Netherlands April 28, 1956

2 Claims. (Cl. 23—50)

The invention relates to a method of producing zinc selenide by means of a reaction which is rapidly performed and has a satisfactory yield.

Zinc selenide is employed in engineering for many purposes, for example for the production of paint and luminescent substances. Particularly for the last-mentioned use the zinc selenide should have a high degree of purity, since small impurites may have a greatly disturbing effect on the luminescence. A plurality of methods are known which can provide zinc selenide with an adequate degree of purity; they are, however, complicated. By a dry method zinc selenide may, for example, be produced by reducing zinc selenite with hydrogen. However, this method has the disadvantage that at the temperatures between 300° C. and 400° C., which are recommended for the reduction, not does only a reduction takes place in which the zinc selenite is converted into zinc selenide and in which water is formed, but also a decomposition of the zinc selenite into zinc oxide and selenium oxide takes place. Since at the production temperature employed the selenium oxide is volatile and escapes with the water vapour, the product of the reaction is a mixture of zinc selenide and zinc oxide. The yield of this method is low and, moreover, the zinc selenide must afterwards be freed from the zinc oxide, which gives rise to great difficulties.

The method according to the invention is also based on the reduction of zinc selenite with hydrogen. However, in contradistinction to the known methods the reduction is carried out at a temperature between 900° C. and 1200° C., the zinc selenite being introduced into the heated hydrogen in a manner such that it assumes the temperature thereof almost at once. Preferably the zinc selenite in a finely divided state is, to this end, strewn or sprayed into a flow of hydrogen of a temperature between 900° C. and 1200° C. From the materially higher yield of the method according to the invention as compared with that of the known method it can be concluded that at the higher temperatures the velocity of the reduction has, comparatively, increased much more than the velocity of the decomposition. The method according to the invention may have a yield of more than 70% in contradistinction to a maximum yield of the known method of about 30%. Moreover, the zinc selenide obtained is almost entirely pure (it is, at the most, contaminated by a very small percentage of zinc). At the high production temperature the zinc oxide produced by the decomposition is immediately reduced to zinc which is volatile and hence escapes.

The invention will now be explained more fully with reference to the accompanying drawing.

Referring to the drawing, reference numeral 1 designates a reaction vessel of quartz, having an inlet 2 for the hydrogen and an outlet 3. In the reaction vessel is sealed a funnel 4, which is drawn out on the lower side to form a point 5. The lower part of the reaction vessel is located in a furnace 6, which heats the hydrogen introduced at 2 to a temperature lying between 900° C. and 1200° C. This flow of heated hydrogen rises up and escapes at 3. Through the funnel 4, zinc selenite is introduced into the rising flow of hydrogen, the zinc selenite being thus reduced for the major part to zinc selenide and for a small part decomposed into zinc oxide and selenium oxide. The selenium oxide is volatile at the operational temperature, so that it escapes with the hydrogen and the water vapour. The zinc oxide is rapidly reduced to zinc, which is also volatile at the said temperature and hence escapes also.

The zinc selenide is collected partly at 7 on the bottom side of the tube 1 and is deposited partly after sublimation on the upper part 8 of the wall of the reaction vessel.

If desired, the funnel 4 may be replaced by an injector which sprays the zinc selenite in a finely divided state into the rising flow of hydrogen.

What is claimed is:

1. A method of producing zinc selenide comprising the steps, heating hydrogen gas in a confined zone to a temperature between about 900° C. and 1200° C. and introducing into said heated hydrogen zinc selenite whereby said zinc selenite is substantially immediately brought to the temperature of the heated hydrogen and removing the resultant zinc selenide from the reaction mixture.

2. A method of producing zinc selenide comprising the steps, heating hydrogen gas in a confined space to a temperature between about 900° C. and 1200° C. and introducing into said heated hydrogen finely divided zinc selenite whereby said zinc selenite is substantially immediately, brought to the temperature of the heated hydrogen and removing the resultant zinc selenide from the reaction mixture.

References Cited in the file of this patent

UNITED STATES PATENTS 2,008,753    Downing _____ July 23, 1935

OTHER REFERENCES

Hovorka in "Chemical Abstracts," vol. 27, col. 5020[2] (1933).

Mellor's "Comprehensive Treatise on Inorganic and Theoretical Chemistry," Longmans, Green and Co., N.Y., 1923, vol. 10, pages 774 and 776.